(12) United States Patent
Vetten et al.

(10) Patent No.: US 9,346,233 B2
(45) Date of Patent: May 24, 2016

(54) DEVICE AND METHOD FOR PRESSING

(75) Inventors: Thomas Vetten, Düsseldorf (DE);
Christoph Schroiff, Köln (DE)

(73) Assignee: SIG TECHNOLOGY AG, Neuhausen am Rheinfall (CH)

( * ) Notice: Subject to any disclaimer, the term of this patent is extended or adjusted under 35 U.S.C. 154(b) by 646 days.

(21) Appl. No.: 13/395,363

(22) PCT Filed: Sep. 9, 2010

(86) PCT No.: PCT/DE2010/001085
§ 371 (c)(1),
(2), (4) Date: May 31, 2012

(87) PCT Pub. No.: WO2011/029438
PCT Pub. Date: Mar. 17, 2011

(65) Prior Publication Data
US 2012/0233966 A1     Sep. 20, 2012

(30) Foreign Application Priority Data

Sep. 10, 2009   (DE) .......................... 10 2009 042 057

(51) Int. Cl.
*B31B 1/28*       (2006.01)
*B31B 5/02*       (2006.01)
(Continued)

(52) U.S. Cl.
CPC . *B31B 1/28* (2013.01); *B29C 65/02* (2013.01); *B29C 66/112* (2013.01); *B29C 66/1122* (2013.01); *B29C 66/135* (2013.01); *B29C 66/43121* (2013.01); *B29C 66/49* (2013.01); *B29C 66/723* (2013.01); *B29C 66/81423* (2013.01); *B29C 66/81455* (2013.01); *B29C 66/81457* (2013.01); *B29C 66/82421* (2013.01); *B29C 66/8322* (2013.01); *B31B 1/64* (2013.01); *B31B 3/00* (2013.01); *B31F 1/0077* (2013.01);
(Continued)

(58) Field of Classification Search
CPC ........................................................ B31D 5/02
USPC ............. 493/141, 52, 84, 114, 121, 133, 142, 493/143
See application file for complete search history.

(56) References Cited

U.S. PATENT DOCUMENTS 954,962  A *   4/1910   Homburg ..................... 162/403
3,963,394  A     6/1976   Shichman et al.
(Continued)

FOREIGN PATENT DOCUMENTS

FR     1207015 A    2/1960
FR     2315384 A    1/1977
WO     9856570      12/1998

*Primary Examiner* — Christopher Harmon
(74) *Attorney, Agent, or Firm* — Lucas & Mercanti, LLP; Klaus P. Stoffel

(57) ABSTRACT

The invention relates to a device and method used for pressing at least one area of a packaging. The packaging is composed of a multilayer composite material at least in some areas. A pressing tool used for pressing comprises at least one contour element that can be inserted into an interior of the packaging and at least one pressing element that is arranged outside of the interior and opposite the contour element. The pressing element and the contour element are arranged so that the pressing element and the contour element can be positioned relative to each other. The pressing element has an elastic consistency and is provided with a flexible reinforcing device at least in the area of the extent of the pressing element facing the contour element.

12 Claims, 5 Drawing Sheets

(51) Int. Cl.
  *B29C 65/02* (2006.01)
  *B29C 65/00* (2006.01)
  *B31B 1/64* (2006.01)
  *B31B 3/00* (2006.01)
  *B31F 1/00* (2006.01)
  *B29L 31/00* (2006.01)

(52) U.S. Cl.
  CPC ....... *B29C 66/7234* (2013.01); *B29C 66/72321* (2013.01); *B29C 66/72328* (2013.01); *B29C 66/8122* (2013.01); *B29C 66/8242* (2013.01); *B29L 2031/7162* (2013.01); *B31B 5/02* (2013.01); *B31B 2201/2604* (2013.01); *B31B 2201/6026* (2013.01)

(56) References Cited

U.S. PATENT DOCUMENTS

| | | | | |
|---|---|---|---|---|
| 3,971,300 A * | 7/1976 | Bachner | ............... | B29C 65/08 229/138 |
| 4,038,908 A * | 8/1977 | Kauffman | ............... | 493/141 |
| 4,355,425 A * | 10/1982 | Jones et al. | ............... | 2/402 |
| 4,474,563 A * | 10/1984 | Gallo, Jr. | ............... | 493/141 |
| 4,719,707 A * | 1/1988 | Klapp | ............... | 34/94 |
| 4,986,058 A * | 1/1991 | Carlsson et al. | ............... | 53/563 |
| 5,056,707 A * | 10/1991 | Larsen | ............... | 229/104 |
| 5,135,463 A * | 8/1992 | Hyduk | ............... | B31B 1/28 493/133 |
| 5,295,941 A * | 3/1994 | Fujikawa et al. | ............... | 493/133 |
| 5,482,204 A * | 1/1996 | Mills et al. | ............... | 229/137 |
| 5,551,211 A * | 9/1996 | Kennedy | ............... | B31B 1/64 493/141 |
| 5,683,339 A * | 11/1997 | Mills et al. | ............... | 493/58 |
| 5,762,595 A * | 6/1998 | Santiago et al. | ............... | 493/133 |
| 5,976,317 A * | 11/1999 | Podsiadlo et al. | ............... | 156/583.3 |
| 6,094,884 A * | 8/2000 | Christensen et al. | ............... | 53/375.9 |
| 6,739,499 B1 * | 5/2004 | Bachner | ............... | 229/104 |
| 2006/0161251 A1 * | 7/2006 | Shaw | ............... | 623/2.41 |
| 2010/0147938 A1 * | 6/2010 | Littlejohn et al. | ............... | 229/407 |

* cited by examiner

DEVICE AND METHOD FOR PRESSING

The present application is a 371 of International application PCT/DE2010/001085, filed Sep. 9, 2010, which claims priority of DE 10 2009 042 057.6, filed Sep. 10, 2009, the priority of these applications is hereby claimed and these applications are incorporated herein by reference.

BACKGROUND OF THE INVENTION

The invention relates to a device for pressing at least an area of packaging, which, at least over areas thereof, is formed of a multilayer composite material, and in which a pressing tool has at least one contour element which can be moved into an interior of the packaging, and at least one pressing element which is arranged on the outside in relation to the interior and located opposite the contour element, and in which the pressing element and the contour element are arranged so as to be capable of positioning relative to each other.

Moreover, the invention relates to a method for pressing at least an area of packaging, which is composed, at least over areas thereof, of a multilayer composite material, and in which, for carrying out the pressing procedure, at least one contour element of a pressing tool is inserted into an interior of the packaging, and in which at least one pressing element is used which is arranged on the outside in relation to the interior and is located opposite the contour element, and in which the pressing element and contour element are positioned relative to each other.

In the manufacture of multilayer composite packaging, for example, beverage packaging, different methods are used. If the manufacture is carried out from an endless composite material web or, by means of so called "hose forming machines," the packaging bottom is only manufactured after filling and closing the packaging. However, if the manufacture is carried out from individual blanks of a cardboard/plastic composite material, these blanks are initially provided with a longitudinal seam, which as a rule, is done by the manufacturer. The longitudinal seams are produced by folding a longitudinal border of the packaging material. They have the purpose to ensure that, for example, a beverage to be filled into packaging does not come into contact with open edges of the composite material. Such a contact could lead to softening of the packaging material and a reduced lifespan of a foodstuff contained in the packaging. The manufacture of the package bottom takes place on the blanks provided with a longitudinal seam, the so called "packaging casings" only directly prior to the filling procedure, usually directly into the filling machine.

For manufacturing the package bottoms, the separated and possibly pre-folded packaging casings are usually pushed onto mandrels of a mandrel wheel, wherein the mandrels are arranged uniformly distributed over the circumference of a mandrel wheel shaft. Depending on the number of processing stations arranged around the mandrel wheel, a timed rotation of the mandrel wheel takes place. If four mandrels are present, the packaging material is pushed on in a first station, and, after a 90° rotation the folding of the packaging bottoms takes place in a second station. After folding the packaging bottoms, several layers of composite material lie, at least over sections, on top of each other.

After a further 90° rotation, the flatly folded packaging bottom is then sealed in the third station by forming the layers which are placed one on top of the other with the synthetic material of the composite material which has been softened under an increased temperature by means of pressure into a packaging bottom having a standing area. Layers of the packaging bottom which, due to folding of the bottom are located above each other, are pressed with the surface of a suitable device from the outer side of the bottom against the mandrel which rests against the inner side of the bottom. The exerted pressure leads, because of the synthetic material being softened as a result of the heat, to a pressing together of the layers and a sealing of the bottom.

The heating of the layers necessary for pressing and sealing can be effected, for example, prior to folding of the packaging bottom. However, it is also conceivable that heating of the synthetic material takes place after folding of the packaging bottom. In addition, by pressing and sealing the packaging bottom, a slight concave shape is formed toward the inner side of the bottom which imparts an especially good stability.

After sealing, the packaging bottom is cooled in order to harden the softened synthetic material in the desired shape. This can take place in the above-described sealing station or also in a separate station. Finally, the finished packaging which is open on one side is pulled from the mandrel of the mandrel wheel and supplied to the actual filling machine, where the packaging interior is cleaned and possibly disinfected and filling and closing of the finished packaging, as well as the shaping of the packaging head, take place.

The folded packaging bottom has, after folding, a thickness which varies over its surface area. The reason for this is that, during folding, in different areas of the bottom different quantity of layers are placed on too of each other. When pressing together and sealing the layers of the folded bottom with a plane pressing surface of a pressing device, wherein the pressing surface covers bottom areas of different thicknesses, there is the problem that different areas of the bottom are pressed and sealed with different intensity. In particular, the layers having a smaller thickness as compared to the adjacent areas are pressed together insufficiently.

For solving this problem, devices for pressing the layers of the packaging bottom are known, which in certain areas of their surface used for pressing, include pressing elements which protrude from the surface. These pressing elements are arranged on the surface of the pressing device in such a way that, when the bottom is pressed, they are assigned to those bottom areas which have a small thickness compared to the adjacent bottom areas. The pressing elements have the purpose of sufficiently pressing, and thereby sealing, the layers in these areas during the pressing procedure.

It is known to form these pressing elements as ribs with edges. However, during the use of these ribs, it may happen that the packaging bottom is damaged in actual practice. Leakages may occur as a result. In addition, the edged ribs lead to an increased contamination of the packaging bottom because dirt can easily collect in the pressing profile produced by the bottom.

Moreover, because of the folds in the area of the longitudinal seams, the bottom has a greater thickness than the adjacent areas. This must be taken into consideration when constructing the surface of the pressing device. When folding the longitudinal seams, it happens time and again that tolerances occur along the length as well as the thickness and height of the longitudinal seams. A compensation of such tolerances can be effected with the known device partially only insufficiently.

It is also already known, for achieving uniform pressing forces as well as for avoiding pressing forces which are too high, to use elastic pressure cushions which are elastically pressed in, for example, in the area of layers of the packaging which are placed on each other, and thereby reduce the application of excessive pressing forces in this area. However, in such elastic pressure cushions, the respective edges or step-like transitions in the area of the materials to be pressed together, causes an increased wear in such elastic cushions, so that, under the consideration of the required frequent replacement of such pressure cushions, as well as under consideration of the abrasion caused by wear, the use of such devices did not find acceptance.

SUMMARY OF THE INVENTION

It is the object of the present invention to construct a device of the above-mentioned type in such a way that an optimum introduction of pressing forces, as well as a long usefulness, is reinforced.

In accordance with the invention, this object is met in that the pressing element has an elastic consistency, and is provided at least in the area of its extension facing the contour element with a flexible reinforcing device.

Another object of the present invention is to improve a method of the above-mentioned type in such a way that the introduction of the pressing forces is optimized and a long usefulness is reinforced.

In accordance with the present invention, this object is met in that a pressing element with an elastic consistency is used, and that the pressing element is, at least in the area of its extension facing the contour element, provided with a flexible reinforcing device.

In accordance with the invention, the resilient properties of a pressing element are combined with an increased protection against wear. The elastic pressing element ensures that in the areas of overlapping layers or of protruding contour areas, pressing forces are produced which are not too high or too low. However, simultaneously the wear occurring at the elastic pressing element caused by the step-shaped or angled bottom contours is prevented by the flexible reinforcing device. The flexible properties of the reinforcing device result in a sufficient contact with the desired bottom contour, and the reinforcing device can thereby follow an elastic deformation of the pressing element.

Furthermore, the use of the pressing device according to the invention makes it possible to take into consideration position tolerances of the different laminate layers. Also, in the case of varying positioning of the transition between the laminate layers, the flexible pressing element reinforces an optimized introduction of the pressing forces. Accordingly, independently of the concrete geometry of the bottom area, pressing forces which are too high and cause damage to the material are avoided, on the one hand, and pressing forces which are too low because they do not produce completely welded bottom areas and, therefore, can lead to leakage, are also avoided.

The combination of the elastic pressing element and the flexible reinforcing device supports the optimized operation of the pressing procedure, even in the case of rapid exchanges of the load plays, for example, when carrying out 1,000 or more pressing procedures per hour.

A particularly moveable structure is made available by constructing the reinforcing device of a plurality of ring-like reinforcing elements.

A uniform mobility in all three spatial dimensions is reinforced in that the reinforcing elements have an essentially circular ring-shaped configuration.

A particularly high wear resistance can be achieved by constructing the reinforcing device at least partially of metal.

In accordance with a typical embodiment, it is provided that the reinforcing device is arranged in the area of a surface of the pressing element.

A simple manipulation of the pressing element is reinforced by embedding the reinforcing device at least over areas thereof into the pressing element.

In accordance with another variation, it is also being considered to arrange the reinforcing device at least over portions thereof at a distance from the pressing element.

A typical use is defined in that the pressing tool is constructed for sealing overlapping lugs of the packaging. These lugs may be arranged in the area of a bottom of the packaging.

DETAILED DESCRIPTION OF THE INVENTION

Figure 1:
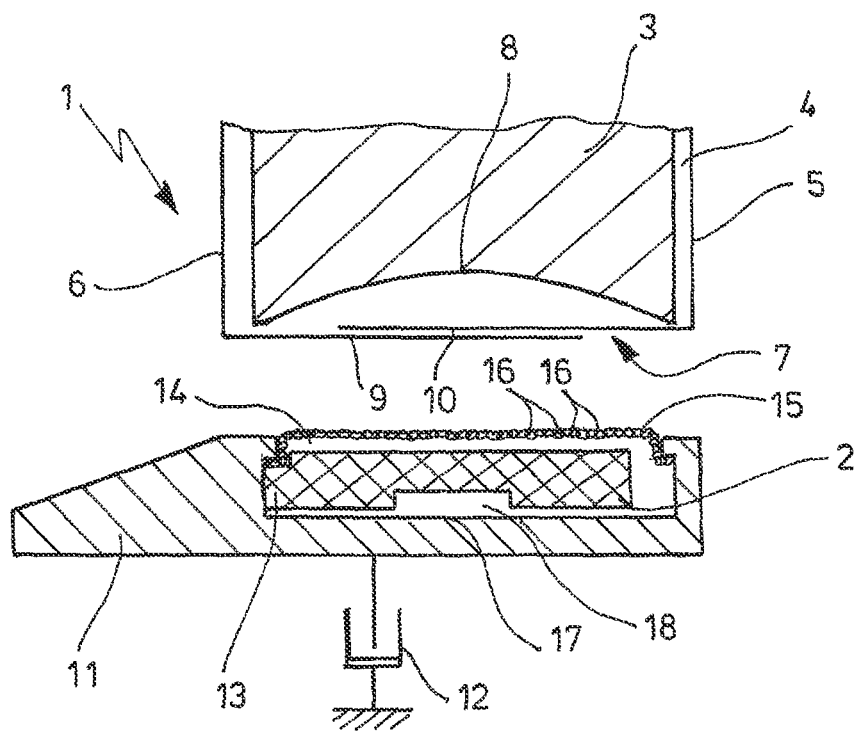
FIG. 1 is a partial illustration of a cross-section through a pressing device with corresponding container-like composite material in an unpressed state of the bottom.

In accordance with the embodiment of 1, a pressing tool 1 consists essentially of a pressing element 2 arranged opposite a contour element 3. The contour element 3 can be inserted by a positioning device, not shown, in an interior space 4 of a packaging 5. The packaging 5 is preferably constructed of a laminate-like material and has side walls 6 as well as a bottom 7. The material of the packaging 5 is composed preferably of several layers of the laminate, wherein at least one layer is of synthetic material and at least one layer is of cardboard. For achieving barrier properties, typically an additional aluminum layer is used.

FIG. 1 shows that the contour element 3 has in the area of its extension facing the bottom 7 a shaped contour 8. In the illustrated embodiment, the shaped contour 8 has the purpose of making available a bottom 7 which is arched in the direction toward the inner space 4. FIG. 1 shows the bottom 7 prior to carrying out the pressing procedure. Two lugs 9, 10 of the material of the bottom 7 which partially overlap each other can be seen, wherein the lugs are connected to each other when the pressing procedure is carried out.

In accordance with FIG. 1, the pressing element 2 is arranged in a base 11. Preferably, the base 11 is able to be positioned by a positioning device 12 into the direction facing the contour element 3 or in an opposite direction. In accordance with the illustrated body, the pressing element 2 is placed in a recess 13 of the base 11. An opening 14 of the recess 13 is arranged in the direction toward the contour element 3.

In the illustrated embodiment, the pressing element 2 is composed of a synthetic material which may be constructed as a single-layer or multiple-layer material. In particular, it is intended to construct the pressing element 2 of an elastic material. A reinforcing device 15 extends at least over areas thereof along a surface of the pressing element 2, which faces the contour element 3. The reinforcing device 15 is preferably assembled from individual reinforcing elements 16 which are connected to each other. The reinforcing elements 16 are preferably of metal.

From FIG. 1 it can also be seen that the pressing element 2 has in the area of its extension facing a base surface 17 of the base 11, a pressure chamber 18. Compressed air or another fluid can act on the pressure chamber 18 in order to provide a relative movement between the pressing element 2 and the base 11.

Figure 2:
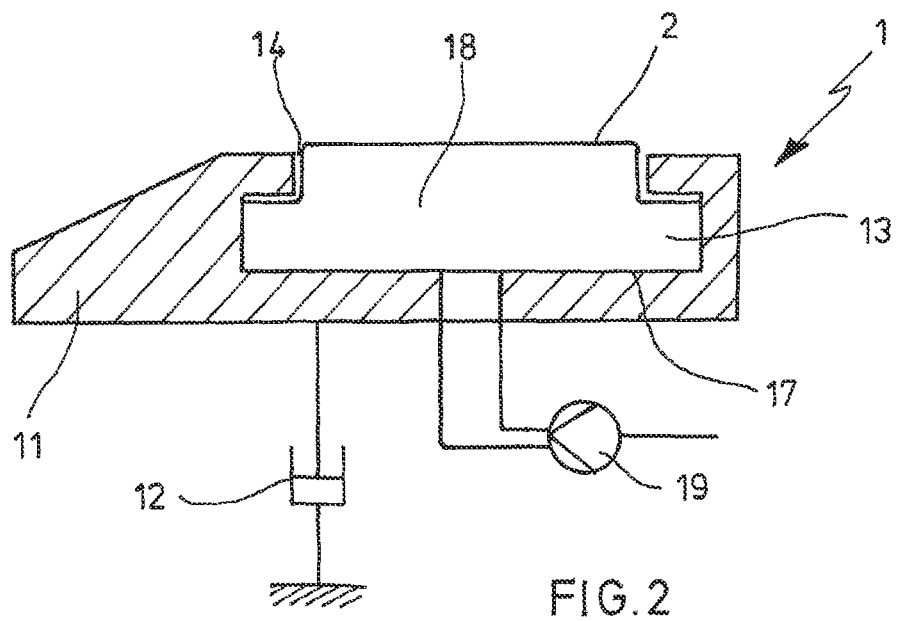
FIG. 2 is a modified illustration of a pressing device with pneumatic pressure cushion.

In accordance with the embodiment in FIG. 2, the pressing element 2 is constructed as a diaphragm which is connected in a pressure tight manner to the base 11. The reinforcing element 16 is preferably worked into the diaphragm. However, similar to the embodiment of FIG. 1, it is also conceivable that the reinforcing device 15 extends between the diaphragm and the bottom 7. In this embodiment, a suitable fluid can be admitted to the pressure space 18 with the use of a pressure source 19, for example, by compressed air, water or oil. In accordance with another embodiment, the pressing element 2 is composed of an incompressible but simultaneously elastic material.

Figure 3:
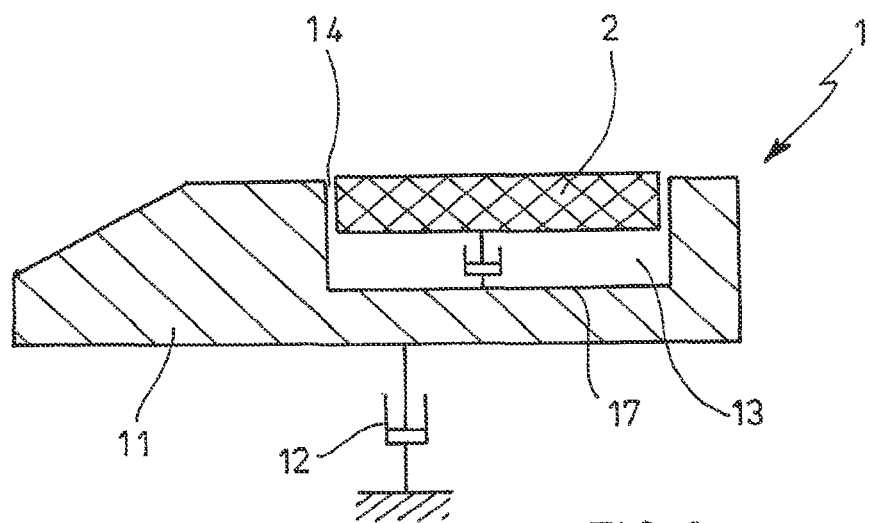
FIG. 3 shows an embodiment with a pressing element which is resiliently mounted in the direction of the pressing forces.

FIG. 3 is a partial illustration of a pressing tool 1 in which the pressing element 2 is adjustable by a separate positioning device 20 relative to the base 11. The basic construction corresponds essentially to the embodiments of FIG. 1 and FIG. 2.

Figure 4:
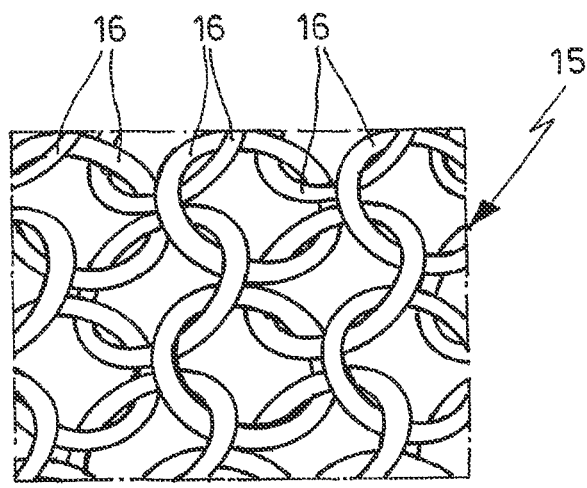
FIG. 4 is a partial illustration of a flexible reinforcing device composed of ring-like reinforcing elements which are connected to each other.

FIG. 4 shows a preferred embodiment for realizing the reinforcing device 15. It can be seen that a plurality of ring-like reinforcing elements 16 are connected to each other in the manner of a net. The ring shaped structures which engage each other lead to a very high flexibility and mobility of the reinforcing device 15. Consequently, the reinforcing device 15 can without problems adapt to step-like patterns or to kink-like changes of direction of reference surfaces.

Figure 5:
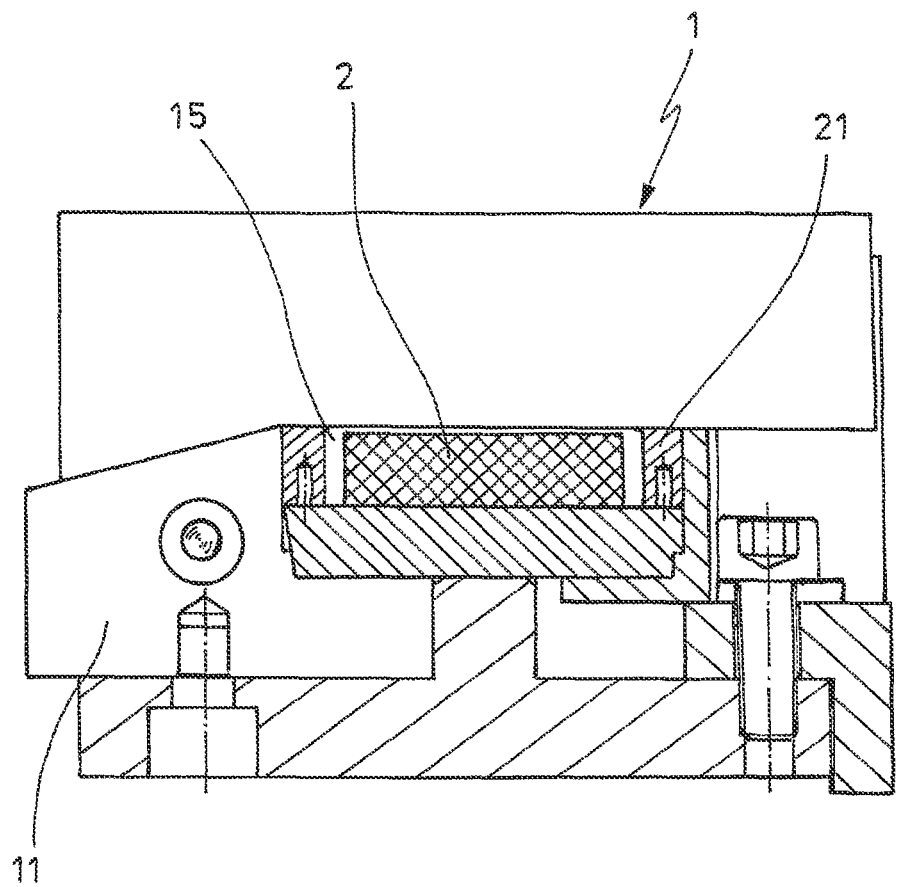
FIG. 5 is a detailed illustration of a pressing device.

FIG. 5 shows a more detailed illustration of a pressing tool 1, similar to the illustration of FIG. 1. For supporting the pressing element 2 in the area of the base 11, a frame 21 is used. The pressing element 2 can, in this embodiment, consist of a synthetic material. The reinforcing elements 16 illustrated in FIG. 4 have an approximately circular ring-like structure.

The illustrated circular ring-shaped structures have a particularly uniform mobility of the individual reinforcing elements 16 relative to each other.

In an alternative to the arrangement shown in FIG. 1 of the reinforcing element 16 next to the pressing element 2, possibly resting directly on a surface of the pressing element 2, or at a distance therefrom, it is also being considered to embed the reinforcing device 15 entirely or partially in the material of the pressing element 2. This can be effected, for example, by manufacturing the pressing element 2 by injection molding or, in the case of the use of elastomer materials by vulcanization.

Figure 6:
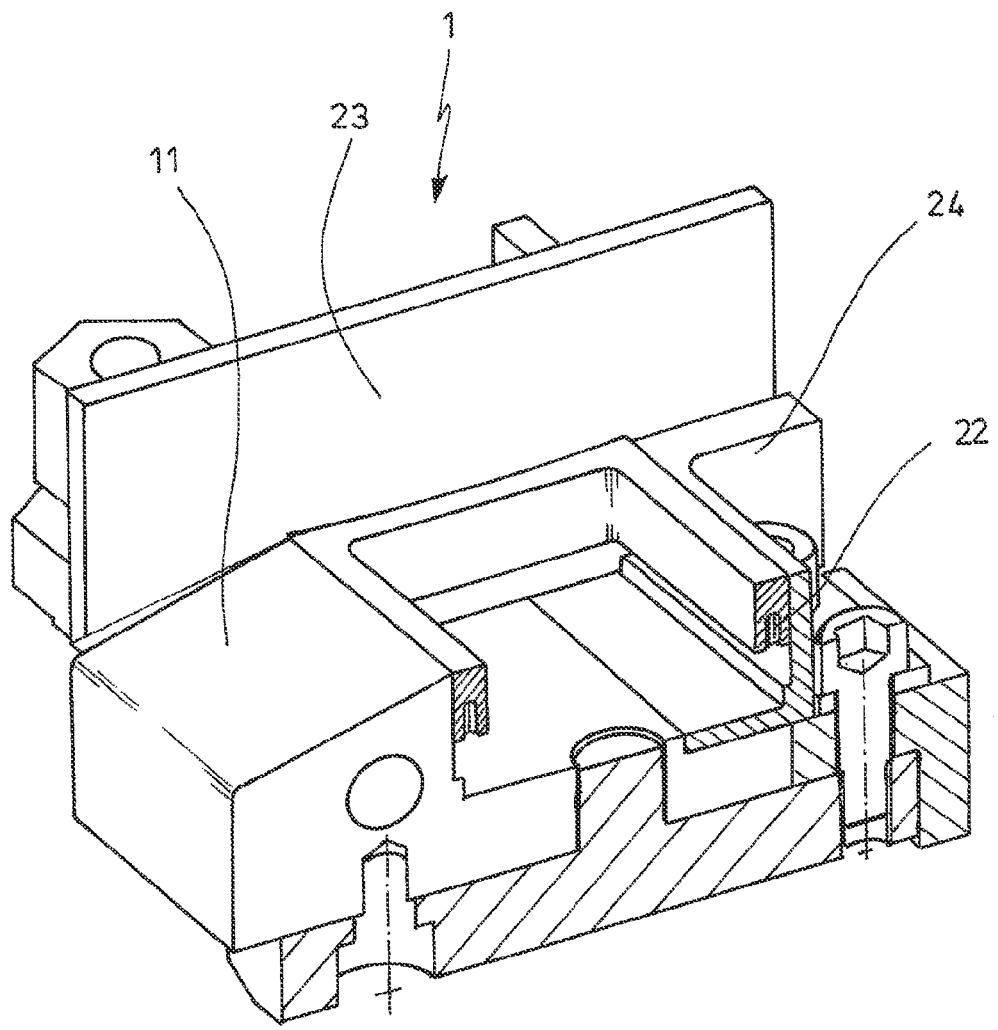
FIG. 6 is a perspective view of the pressing device according to FIG. 5 after removal of the pressing element.

The illustration in FIG. 6 shows the pressing tool 1 according to FIG. 5 in a perspective view and after the disassembly of the pressing element 2. It can particularly be seen that the frame 21 has bores 22 for receiving tensioning pins to support the reinforcing device 15 when the pressing element 2 is constructed separately from the reinforcing device 15. Moreover, a lateral guide element 23 with a groove for receiving the frame 21 as well as a cover 24 for fastening purposes.

Figure 7:
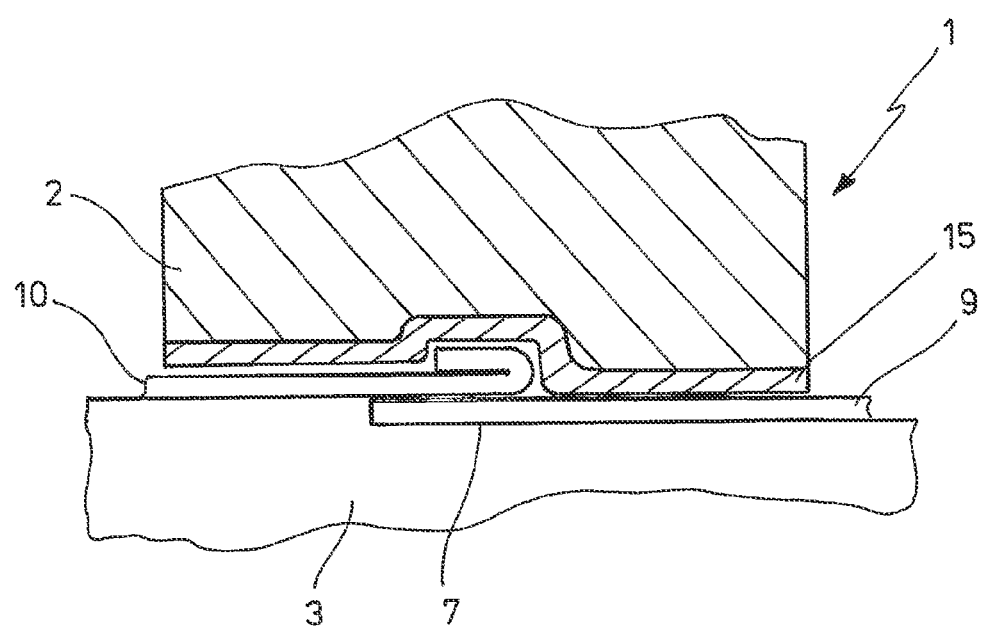
FIG. 7 is another illustration for showing the relationship between the elastic pressing element, the flexible reinforcing device, and overlapping layers of the material to be pressed.

FIG. 7 once again shows a typical manner of carrying out a pressing procedure for connecting two lugs 9, 10 of a bottom 7. For this purpose, the lug 10 is additionally bent in the overlapping area with the lug 9, in order to avoid a freely protruding cutting edge. It can be seen that the reinforcing device 15 can be adapted without problems to the step-shaped contour pattern and thereby protects the elastic pressing element 2 against wear effects.

The use of the reinforcing device 15, which is composed of the ring-like reinforcing elements 16, has additional advantages in addition to protecting the pressing element 2 against an abrasive wear. In particular, the quality of the pressing procedure is positively influenced. Because of the ring-shaped contour of the reinforcing elements 16, there is at the beginning of the pressing procedure a point-like or line-like contact with the workpiece to be pressed. Consequently, the pressing forces are initially transmitted by a very small contact surface, which has the result that the material to be pressed is plastically deformed in the region of this very small surface. The reason for this is that the rounded surface contours of the reinforcing elements 16, which face the workpiece to be pressed, are forced into the material to be pressed.

With increasing pressing forces and increasing penetration depth of the reinforcing elements 16 into the material to be pressed, the magnitude of the surfaces transmitting the forces very quickly rises, so that an undesirable further penetration of the reinforcing elements 16 into the material to be pressed does not occur. As a result of the increasing contact surface, the surface pressure is reduced. The pressing procedure then changes from an elastic-plastic material deformation into an elastic material deformation.

During the first pressing phase, the plastic deformation causes a flux of the material which, especially in the area of projection shadows of the step-shaped contours, leads to gluing of the lugs 9, 10 and, in turn, to increased tightness of the packaging 5. Consequently, the use of the reinforcing device 15 in accordance with the invention facilitates an optimization of the pressing procedure, even if positional tolerances are taken into consideration.

The ring-like connection of the individual reinforcing elements 16 for making available the reinforcing device 15 leads to the high contour adaptability, especially due to the fact that the individual reinforcing elements 16 are moveable relative to each other in all three spatial dimensions. The reinforcing elements 16 can be pushed into each other in a plane extending in a transverse direction, as well as in a longitudinal direction. Moreover, the individual reinforcing elements 16 can be pivoted without significant restoring forces relative to each other out of a reference plane.

This has the result that an adaptation of a contour to patterns with edges can also take place without problems. In particular, if fiber-like or strand-like material were used for the reinforcing element 16, such an optimum flexibility would not exist because elastic restoring forces are involved here. The reinforcing device 15 according to the invention is, therefore, preferably composed of reinforcing elements 16 which have relatively small dimensions and engage into each other in an articulated manner.

The invention claimed is:

1. A device for pressing at least one area of a packaging composed at least over areas thereof of a multilayer composite material, comprising a base having a recess with a base surface and forming an opening: a pressing tool having at least one contour element insertable into an interior space of the packaging; at least one pressing element arranged externally relative to the interior space and located opposite the contour element, the pressing element and the contour element being positionable relative to each other, the pressing element having an elastic consistency; and a flexible reinforcing device arranged to extend across the opening and at least in an area of an extension of the pressing element facing the contour element, wherein the pressing element is arranged in the recess of the base so as to be between the base surface and the reinforcing device, wherein the reinforcing device includes a plurality of reinforcing elements.

2. The device according to claim 1, wherein the reinforcing device includes a plurality of ring-like reinforcing elements.

3. The device according to claim 2, wherein the ring-like reinforcing elements engage at least partially into each other.

4. The device according to claim 2, wherein the reinforcing elements have a substantially circular ring-shaped configuration.

5. The device according to claim 1, wherein the reinforcing device is at least partially made of metal.

6. The device according to claim 1, wherein the reinforcing device is arranged in an area of a surface of the pressing element.

7. The device according to claim 1, wherein the reinforcing device has portions embedded in the pressing element.

8. The device according to claim 1, wherein the reinforcing device has portions arranged at a distance from the pressing element.

9. The device according to claim 1, wherein the pressing tool is constructed to seal overlapping lugs of the packaging.

10. The device according to claim 1, wherein the pressing tool is constructed to act on at least one portion of a bottom of the packaging.

11. The device according to claim 2, wherein the ring-like reinforcing elements are interlocking.

12. A method for pressing at least an area of a packaging composed at least over areas thereof of a multilayer composite material, comprising the steps of: introducing at least one contour element of a pressing tool into an interior space of the packaging; providing a pressing element having an elastic consistency; providing a base element having a recess with a base surface and forming an opening; arranging the pressing element in the recess of the base so as to be outside the packaging relative to the interior space and opposite the contour element; providing a flexible reinforcing element, made up of a plurality of reinforcing elements, to extend across the opening of the recess and at least in an area of an extension of the pressing element facing the contour element so that the pressing element is between the base surface and the referencing device; positioning the pressing element and the contour element relative to each other; and pressing the packaging between the pressing element and the contour element.

* * * * *